United States Patent

Yang et al.

Patent Number: 6,118,646
Date of Patent: Sep. 12, 2000

[54] CAPACITOR STRUCTURE

[76] Inventors: Akira Yang, 9F-2, No. 262, Sec. 2, Ho-Han Road; Jiing H. Wang, 6F-3, No. 199, Ning-Hsia Road, both of Taichung, Taiwan

[21] Appl. No.: 09/222,725

[22] Filed: Dec. 29, 1998

[51] Int. Cl.[7] .................................................. H01G 4/00
[52] U.S. Cl. .................. 361/301.3; 361/517; 361/535; 361/519; 174/52.1; 174/52.5
[58] Field of Search ............................. 361/301.3, 517, 361/518, 519, 520, 536, 537, 538, 535; 174/52.1, 52.5

[56] References Cited

U.S. PATENT DOCUMENTS

| | | | |
|---|---|---|---|
| 3,444,436 | 5/1969 | Coda | 361/773 |
| 5,548,473 | 8/1996 | Wang | 361/301.1 |
| 5,650,759 | 7/1997 | Hittman et al. | 333/182 |

Primary Examiner—Kristine Kincaid
Assistant Examiner—Hung V Ngo
Attorney, Agent, or Firm—Rosenberg, Klein & Lee

[57] ABSTRACT

A capacitor structure including a housing and two copper plates disposed on two sides of an interior of the housing. A capacitor element is installed in the housing. The opposite inner sides of each copper plate are disposed with multiple longitudinally arranged small resilient plates which inward extend to engage with the capacitor element in the housing. An outer side of each copper plate is disposed with an upper and a lower engaging plates which are longitudinally inclinedly arranged. The upper and lower engaging plates serve to engage with or attach to a conductive wire inserted into the housing. The upper and lower engaging plates of the copper plate can at the same time contact with the conductive wire so that it can enhance the electricity conduction effect. The capacitor structure enables a user to replace the capacitor element and copper plates by himself.

8 Claims, 4 Drawing Sheets

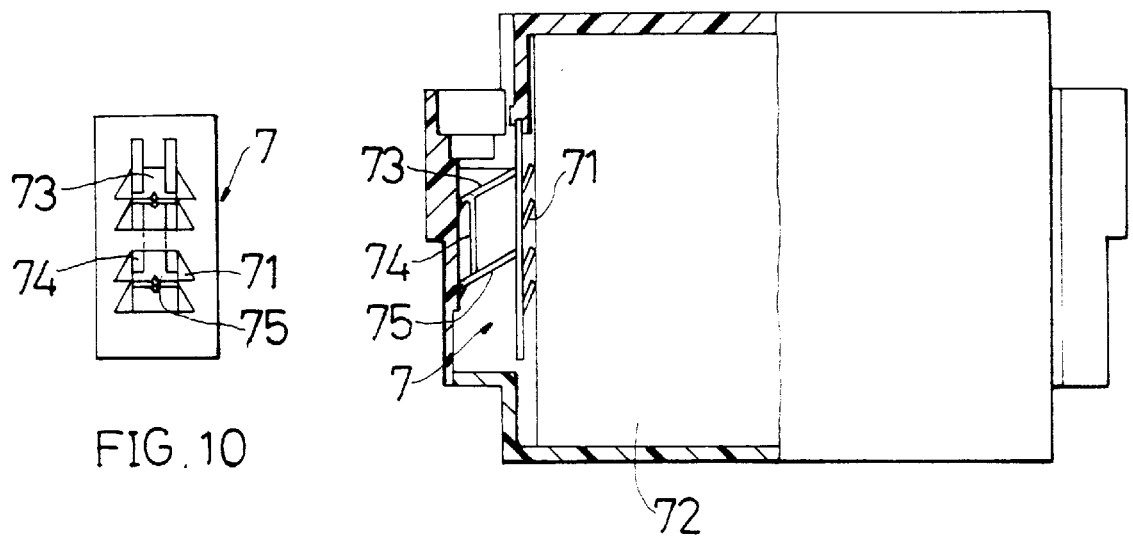
FIG. 10
FIG. 9
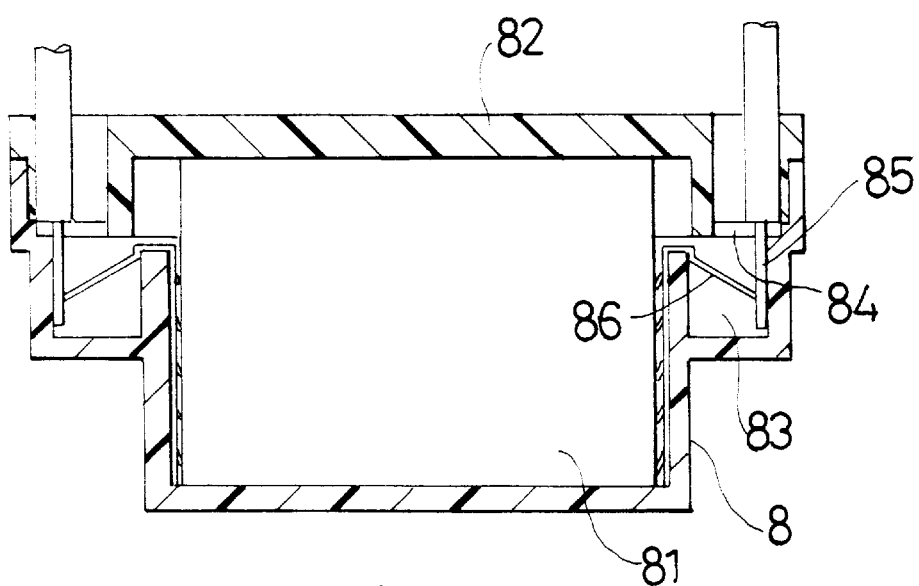
FIG. 11
PRIOR ART

CAPACITOR STRUCTURE

BACKGROUND OF THE INVENTION

The present invention relates to a capacitor structure which has better electricity conduction effect and enables a user himself to replace the capacitor element or copper plates.

FIG. 11 shows an existing capacitor in which a capacitor element 81 is disposed in a housing 8 and a cover body 82 is fused with the housing 8 by ultrasonic wave. Each side of the housing 8 is formed with an insertion section 83. Each side of the cover body 82 is formed with a socket 84 for a conductive wire 85 to insert thereinto. A copper plate 86 is mounted in the insertion section 83 for electrically connecting with the capacitor element 81. The end of the copper plate 86 is engaged with the inserted conductive wire 85 so that only one single point of the end of the copper plate 86 contacts with the conductive wire 85. Moreover, the capacitance is characterized by 90 degree phase leading current so that the instantaneous current is very great.

This often leads to many undesired phenomena. In addition, during the ultrasonic fusion operation, it often takes place that the cover body 82 and the housing 8 are over-fused. This will block the socket 84 or make the copper plate 86 adhered to the cover body or the housing. Therefore, the conductive wire 85 can be hardly smoothly inserted into the socket and a product with poor quality will be produced. Furthermore, the fusion seam between the cover body 82 and the housing 8 is often irregular due to over-fusion thereof. This results in poor appearance of the capacitor. Also, once the cover body 82 is fused with the housing 8, the cover body 82 cannot be detached therefrom. Therefore, in case the capacitor element 81 or the copper plate 86 in the housing 8 is damaged, a user (such as an assembling operator in an electric fan factory) himself cannot replace the capacitor element 81 of the copper plate 86.

SUMMARY OF THE INVENTION

It is therefore a primary object of the present invention to provide a capacitor structure in which an upper and a lower engaging plates of the copper plate serve to at the same time contact with the conductive wire so as to enhance the electricity conduction effect.

It is a further object of the present invention to provide the above capacitor structure which enables a user himself to detach a bottom cover from the housing and replace the capacitor element or copper plates.

The present invention can be best understood through the following description and accompanying drawings, wherein:

BRIEF DESCRIPTION OF THE DRAWINGS

FIG. 9 is a sectional view of a fourth embodiment of the present invention;

FIG. 10 is a side view of the copper plate of the fourth embodiment of the present invention; and FIG. 11 is a sectional view of a conventional capacitor.

DETAILED DESCRIPTION OF THE PREFERRED EMBODIMENTS

Figure 1:
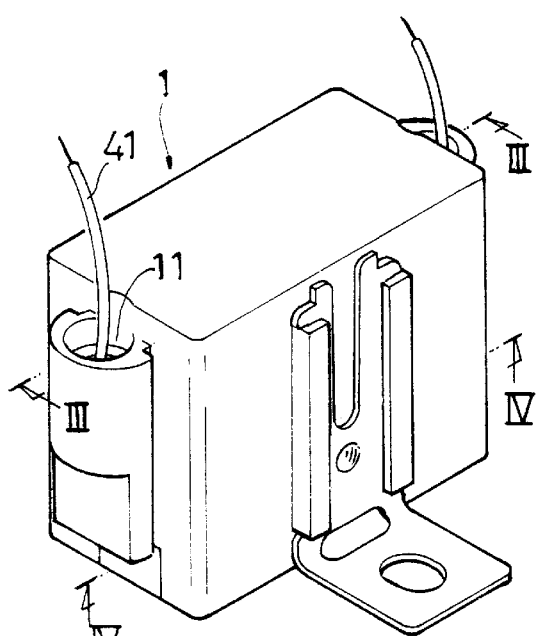
FIG. 1 is a perspective view of a first embodiment of the present invention.
Figure 2:
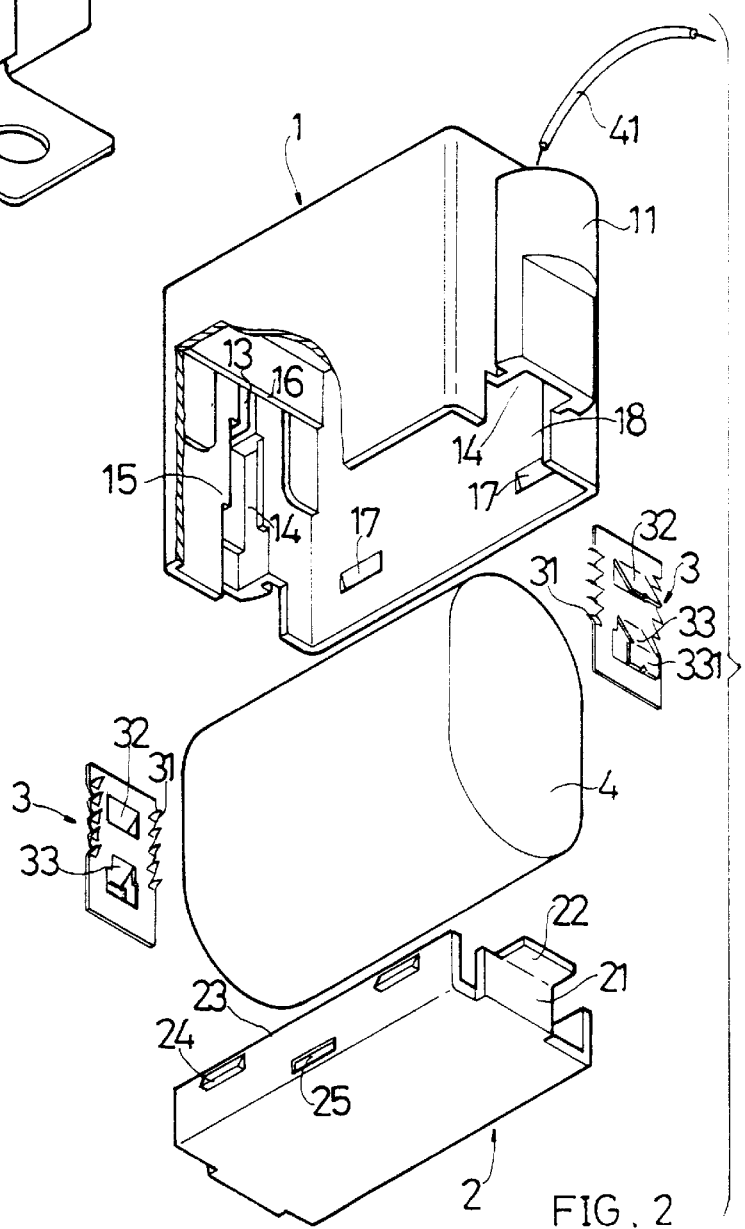
FIG. 2 is a perspective exploded view of the first embodiment of the present invention.

Please refer to FIGS. 1 to 4. According to a first embodiment, the present invention includes:

a housing 1 which is substantially rectangular and has an opening facing downward, a capacitor element 4 being placed in the housing 1, each of left and right sides of the housing 1 being formed with a downward extending insertion section 11 having a circular hole, a lower end of the insertion section 11 being formed with a small diameter portion 12, an inner side of the small diameter portion 12 being formed with a communicating portion 13 communicating with the interior of the housing 1, a bottom end of the communicating portion 13 being communicated with a downward extending receptacle 14 having an open bottom, the receptacles 14 on two sides of the housing 1 respectively extending through the housing 1 into the interior thereof, the receptacles 14 and two lateral inner walls of the housing 1 being respectively formed with engaging projections 15, a top portion of the receptacle 14 in the housing 1 being disposed with an insertion portion 16, a front and a rear inner walls of the housing 1 being respectively formed with two engaging cavities 17, two sides of the bottom of the housing 1 being respectively formed with upward extending locating cavities 18 communicating with the receptacles 14;

a bottom cover 2 coupled with the open bottom of the housing 1, each of left and right sides of the bottom cover 2 being formed with an upward extending projecting portion 21 received in the locating cavities 18 of the housing 1, a top end of the projecting portion 21 having an outward extending vane 22, the vanes 22 serving to seal the bottom of the receptacles 14, a front and a rear side of the bottom cover 2 being respectively disposed with two upward extending fitting portions 23 for inserting into the housing 1, an outer side of each fitting portion 23 being formed with two engaging hooks 24 hooked in the engaging cavities 17 of the housing 1, a slot 25 being formed on the fitting portion 23 between the engaging hooks 24 for drawing out the bottom cover 2; and two copper plates 3, the top ends of the copper plates 3 being respectively inserted into the insertion sections 16 on two sides of the housing 1, a front and a rear sides of each copper plate 3 being respectively formed with multiple longitudinally arranged small resilient plates 31 which inward inclinedly extend from lower side to upper side, the small resilient plates 31 serving to engage with the capacitor element 4 in the housing 1. In addition, an upper portion of each copper plate 3 is integrally formed with an upper engaging plate 32 which is outward folded. The upper engaging plate 32 and the small resilient plates 31 reversely extend into the receptacle 14 of the housing 1. The copper plate 3 is further formed with a lower engaging plate 33 below the upper engaging plate 32, which extends in the same direction as the upper engaging plate 32. A lower end of the lower engaging plate 33 has a bent section 331 which downward extends into the receptacle 14 and has a larger width. The bent section 331 is restricted by the engaging portion 15, whereby before the capacitor element 4 is installed into the housing 1, the copper plate 3 is prevented from dropping into the housing 1.

Figure 3:
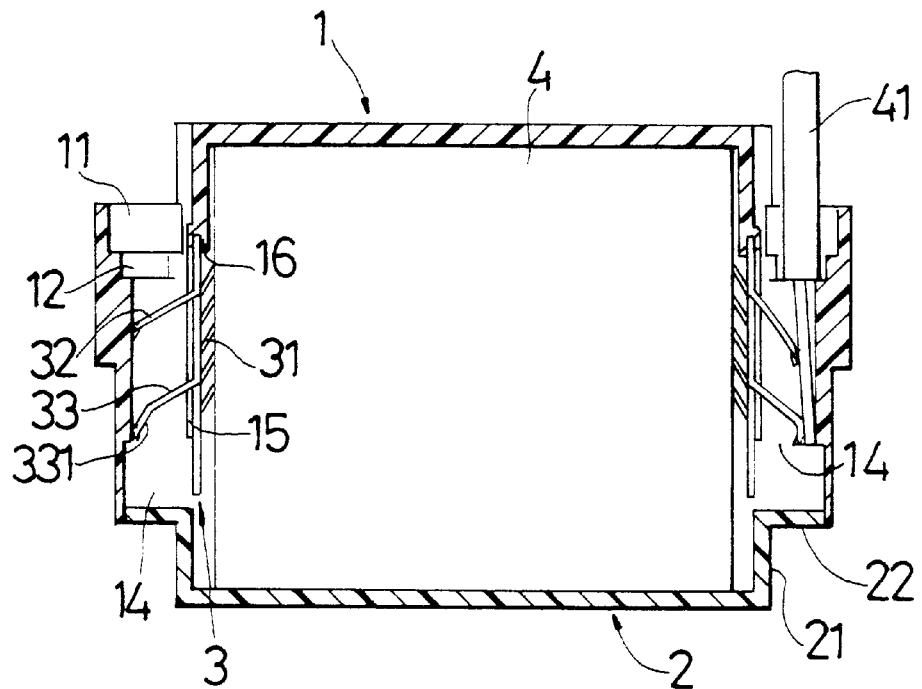
FIG. 3 is a sectional view taken along line III—III of FIG. 1.
Figure 4:
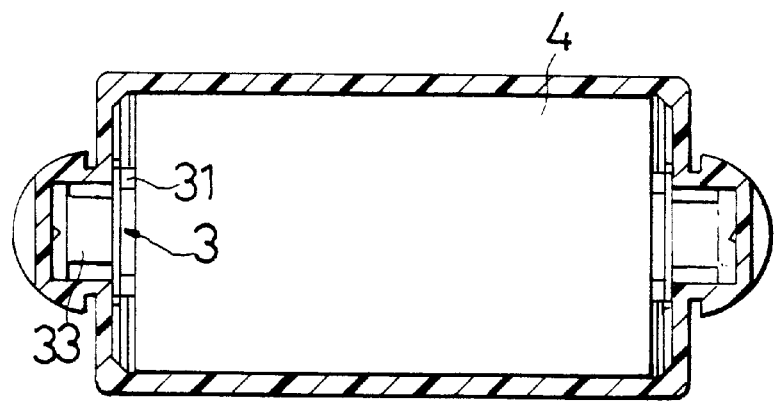
FIG. 4 is a sectional view taken along line IV—IV of FIG. 1.

Please refer to FIGS. 3 and 4. The housing 1 is fitted with the bottom cover 2 by means of the engagement between the engaging hooks 24 of the bottom cover 2 and the engaging sections 15 of the housing 1.

Therefore, the problems resulting from the ultrasonic fusion are eliminated and the conductive wire 41 can be easily inserted into the insertion section 11. Also, after the bottom cover 2 is mated with the housing 1, the appearance thereof will not be affected.

In use of the present invention, the conductive wire 41 can be inserted into the insertion section 11 of the housing 1. The outer diameters of the conductive wire 41 are varied. The bottom end of the insertion section 11 has small diameter portion 12 to suit different dimension of the conductive wire 41. In addition, in the case that the capacitor element 4 or the copper plates 3 are damaged, a user himself can open the bottom cover 2 to replace the capacitor element 4 or copper plates 3 with a new one.

More importantly, the upper and lower engaging plates 32, 33 of the copper plate 3 can respectively contact with the inserted conductive wire 41. Especially, the lower engaging plate 33 linearly contacts with the conductive wire 41, so that no poor contact between the conductive wire 41 and the copper plate 3 will take place. Moreover, the double-point contact of the upper and lower engaging plates 32, 33 can increase the conducted current. Therefore, even the phase leading current generated by the capacitor element 4 can be conducted by the upper and lower engaging plates 32, 33 of the copper plate 3. As a result, a very good electricity conduction can be achieved.

In addition, in case an operator inserts the conductive wire 41 by mistake, the operator only needs to depress the upper engaging plate 32 with a fine needle so as to disengage the upper engaging plate 32 from the conductive wire 41. The lower engaging plate 33 only attaches to the conductive wire 41 so that the operator can easily draw out the conductive wire 41.

According to the above arrangement, the present invention enables a user himself to replace the damaged copper plate 3 or capacitor element 4 and the appearance of the present invention is better than that of the conventional capacitor. Moreover, the present invention is suitable for different dimensions of inserted conductive wires 41 and the copper plate 3 contacts with the conductive wire 41 at more points so that a better electricity conduction is achieved.

Figure 6:
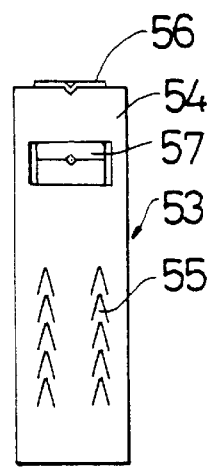
FIG. 6 is a side view of the copper plate of the second embodiment of the present invention.
Figure 5:
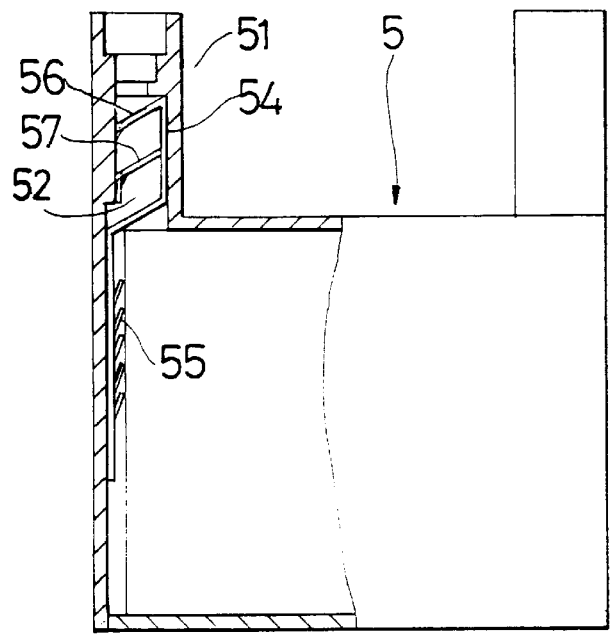
FIG. 5 is a sectional view of a second embodiment of the present invention.

FIGS. 5 and 6 show a second embodiment of the present invention, in which each lateral side of the top portion of the housing 5 is formed with an upward extending insertion section 51. The bottom of the insertion section 51 is formed with a receptacle 52. The receptacle 52 has an upper section 54 which is inward inclinedly bent for receiving therein a copper plate 53.

A lower end of the upper section 54 is disposed with multiple longitudinally arranged small resilient plates 55. An upper engaging plate 56 of the copper plate 53 is positioned at upper end of the upper section 54 and integrally bent outward. A lower engaging plate 57 is positioned below the upper engaging plate 56. The upper and lower engaging plates 56, 57 provide more contact points with the conductive wire so as to enhance the electricity conduction effect.

Figure 8:
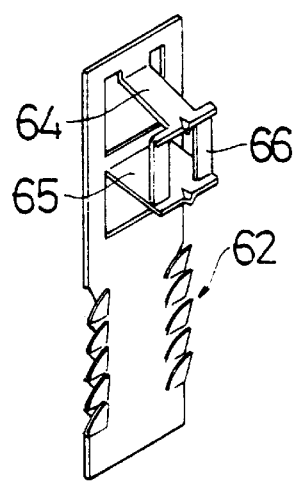
FIG. 8 is a perspective view of the copper plate of the third embodiment of the present invention.
Figure 7:
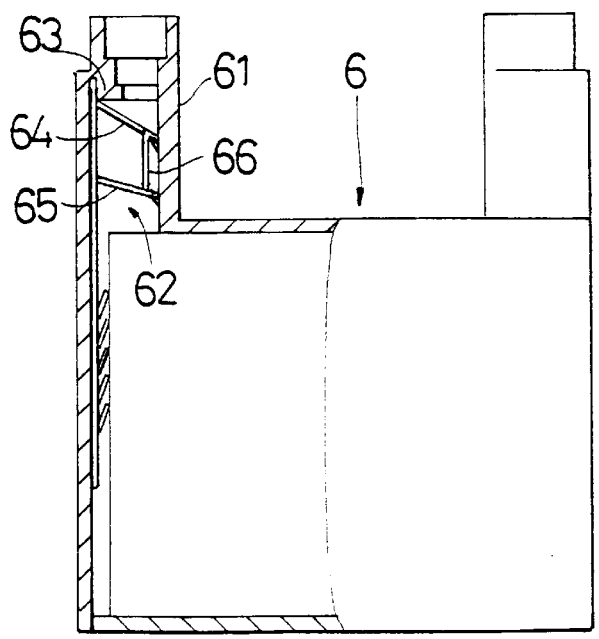
FIG. 7 is a sectional view of a third embodiment of the present invention.

FIGS. 7 and 8 show a third embodiment of the present invention, in which a fitting section 63 is formed in the insertion section 61 of the housing 6 for a top end of the copper plate 62 to insert thereinto. An inner side of upper portion of the copper plate 62 is disposed with downward inclinedly extending upper engaging plate 64 and lower engaging plate 65. Each lateral side of the upper engaging plate 64 is integrally formed with a downward bent pushing section 66. A bottom of the pushing section 66 can contact with the lower engaging plate 65. The lower engaging plate 65 is free from bent section. Both the upper and lower engaging plates 64, 65 can engage with the conductive wire (not shown). According to the above arrangement, when the upper engaging plate 64 is depressed with a fine needle, the two pushing sections 66 can at the same time press downward the lower engaging plate 65 so as to disengage the lower engaging plate 65 from the conductive wire. Therefore, the conductive wire can be easily drawn out.

FIGS. 9 and 10 show a fourth embodiment of the present invention, in which a middle portion of the copper plate 7 is disposed with multiple small resilient plates 71 arranged from upper side to lower side. The multiple small resilient plates 71 make the front and rear portions of the copper plate 7 have smaller width for application to a capacitor element 72 with less thickness. Still more contact points are provided to achieve better electricity conduction effect. Each lateral side of the upper engaging plate 73 is disposed with a pushing section 74. The bottom of the pushing section 74 can contact with the lower engaging plate 75.

It is to be understood that the above description and drawings are only used for illustrating some embodiments of the present invention, not intended to limit the scope thereof. Any variation and derivation from the above description and drawings should be included in the scope of the present invention.

What is claimed is:

1. A capacitor structure comprising a housing and two copper plates disposed on two sides of an interior of the housing, a capacitor element being installed in the housing;

each copper plate having an inner side and an outer side, the inner side of each copper plate is disposed with multiple longitudinally arranged small resilient plates which inward extend to engage with the capacitor element in the housing, the outer side of each copper plate being disposed with an upper and a lower engaging plate which are incliningly arranged, the upper and lower engaging plates serving to engage with or attach to a conductive wire inserted into the housing.

2. A capacitor structure as claimed in claim 1, wherein a lower end of the lower engaging plate is disposed with a downwardly extending bent portion.

3. A capacitor structure as claimed in claim 1, wherein an upper section of the copper plate is inward incliningly bent and the small resilient plates are positioned at a middle portion of the copper plate.

4. A capacitor structure as claimed in claim 1, wherein the small resilient plates of the copper plate are disposed on two sides of the copper plate.

5. A capacitor structure as claimed in claim 1, wherein the housing is substantially rectangular and has an opening facing downward, each of left and right sides of the housing being formed with a downward extending insertion section, a bottom end of the insertion section communicating with a receptacle extending to a middle portion of the housing, the receptacles on the sides of the housing respectively extending through the housing into the interior thereof, a front and a rear inner wall of the housing being respectively formed with at least two engaging cavities near the opening of the housing, the sides of the housing being respectively formed with upward extending locating cavities communicating with the receptacles of the insertion sections, a bottom cover being coupled with the opening of the housing, each of left and right sides of the bottom cover being formed with an upward extending projecting portion received in the locating cavities of the housing, a top end of the projecting portion having an outward extending vane, the vanes serving to seal the bottom of the receptacles, a front and a rear side of the bottom cover being respectively disposed with two upward extending fitting portions for inserting into the housing, an outer side of each fitting portion being formed with at least one engaging hook hooked in one of the engaging cavities of the housing.

6. A capacitor structure as claimed in claim 1, wherein each lateral side of the upper engaging plate of the copper plate is integrally formed with a downward bent pushing section which can contact with the lower engaging plate.

7. A capacitor structure as claimed in claim 5, wherein each lateral side of the housing is formed with an upward extending insertion section.

8. A capacitor structure as claimed in claim 5, wherein each lateral side of the housing is formed with an insertion section.

* * * * *